United States Patent Office 2,902,435
Patented Sept. 1, 1959

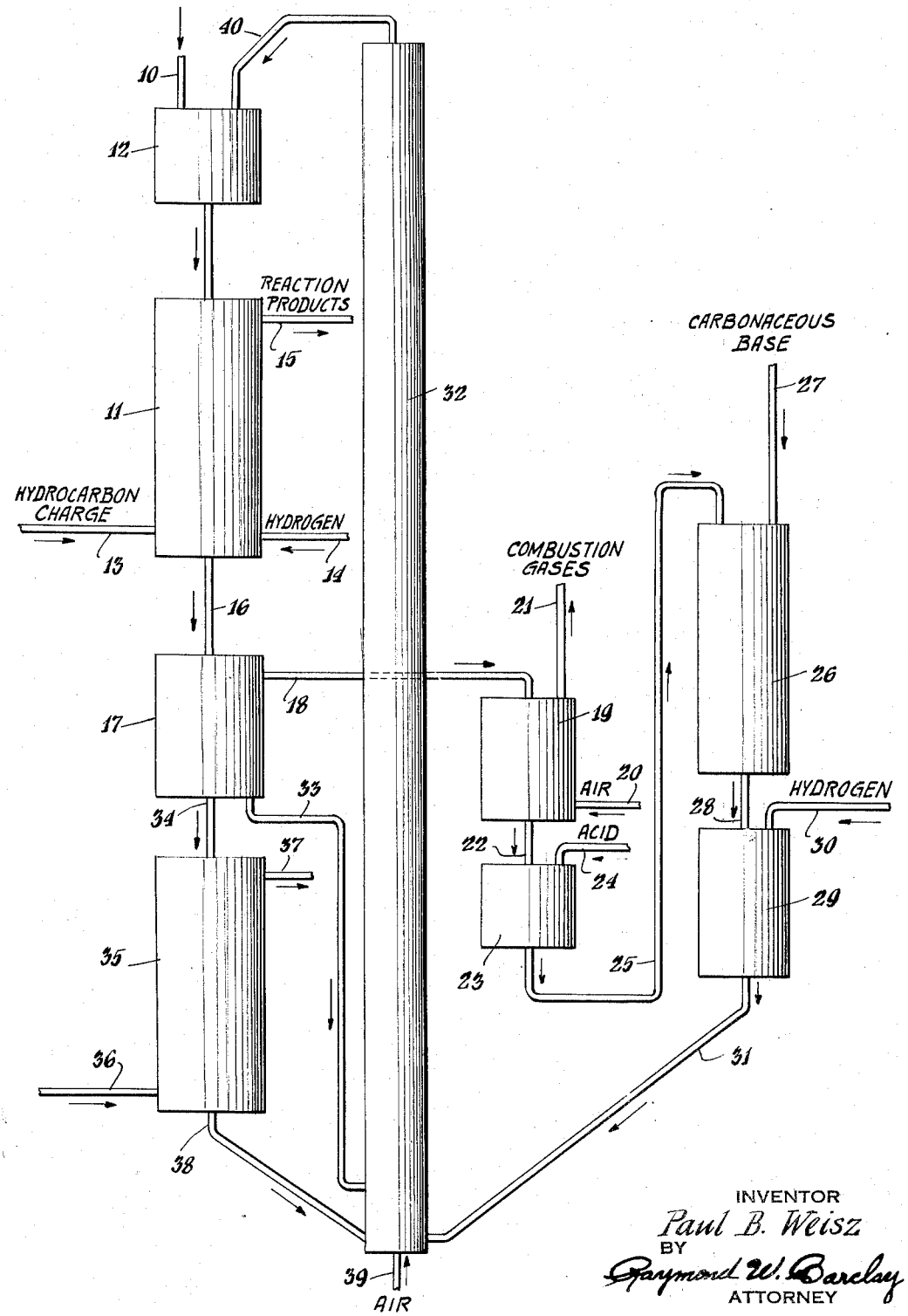

2,902,435

CATALYTIC REFORMING WITH A MIXTURE OF CATALYSTS COMPONENTS CONTAINING PLATINUM

Paul B. Weisz, Pitman, N.J., assignor to Socony Mobil Oil Company, Inc., a corporation of New York Application October 31, 1955, Serial No. 543,664

4 Claims. (Cl. 208—140)

This invention relates to an improved catalytic reforming process for obtaining gasoline of high octane number. More particularly, the present invention is directed to catalytic reforming carried out in the presence of a catalyst consisting essentially of a particularly defined mixture of: (1) particles of a porous carbonaceous carrier impregnated with a small amount of a platinum metal and (2) particles of alumina, activated by the presence therein of an acidic promoter and essentially composed of a mixture of dehydration products of beta alumina trihydrate, in which eta alumina is the predominating component. The invention is further directed to the aforesaid catalyst and to means for regenerating the catalyst after use in reforming operations.

Reforming processes wherein hydrocarbon fractions such as naphthas, gasolines, and kerosene are treated to improve the anti-knock characteristics thereof are well known in the petroleum industry. Reforming is generally carried out by contacting the hydrocarbon charge at an elevated temperature in the presence of hydrogen with a suitable catalyst. The temperature generally employed in reforming is between about 700° F. and about 1000° F. and more usually between about 800° F. and about 975° F. The pressure during reforming is generally within the range of about 100 to about 1000 p.s.i.g. and preferably between about 200 and about 700 p.s.i.g. The liquid hourly space velocity employed, i.e., the liquid volume of hydrocarbon per hour per volume of catalyst, is between about 0.1 and about 10 and preferably between about 0.5 and about 4. In general, the molar ratio of hydrogen to hydrocarbon charge stock is between about 1 and about 20 and preferably between about 4 and about 12.

Hydrocarbon charge stocks generally subjected to reforming and those contemplated for use in the process of this invention comprise mixtures of hydrocarbons and particularly petroleum distillates boiling within the approximate range of 60° F. to 450° F., which range includes gasolines, naphthas, and kerosene. The gasoline fraction may be a full boiling range gasoline. It is, however, preferred to use a selected fraction such as naphtha having an initial boiling point of between about 150° F. and about 250° F. and an end boiling point of between about 350° F. and about 425° F.

It has heretofore been known to employ platinum metal-containing catalysts for promoting reforming reactions of the type discussed above. Platinum reforming catalysts are necessarily characterized by a certain amount of acidity. Thus, it has been proposed to reform hydrocarbon fractions by subjecting the same under reforming conditions with a catalyst comprising a platinum metal supported on an active cracking component. Exemplary of the catalysts which have been used in such reactions are composites of silica and/or alumina combined with small quantities of platinum. In some instances, the silica and/or alumina component has been previously treated with a small amount of halogen and thereafter combined with platinum. In such catalysts, the halogen component is known to be more or less volatile.

Activity losses due to halogen loss are irreversible in nature as contrasted with being regenerable by burning in an oxygen-containing atmosphere. Moreover, such catalysts, even when exhibiting the desired initial activity, have been attended by distinct operational disadvantages, one of which resides in the regeneration of the catalyst and more specifically in the recovery of the valuable platinum metal constituent from the spent catalyst.

In accordance with the present invention, it has been discovered that reforming can be effected in the presence of two chemically distinct catalytic substances which, although chemically not combined, are simultaneously present as mechanical mixtures in the reaction zone and thereby produce a new catalytic activity different from and beyond that obtainable from the simple addition of separate reactions on the two components. Thus, it has been discovered that excellent reforming can be achieved in the presence of a catalyst having a platinum metal deposited on a carbonaceous base when the same is combined in the form of a mechanical mixture with a particular crystallographic form of alumina which has been activated with an acidic promoter, such as fluorine. It has been found that the crystallographic form of the alumina with which the acidic promoter, i.e., halogen, is combined is an important factor, influencing the life of the catalyst upon use thereof in reforming operations. Thus, it has been established in accordance with the present invention that the loss of activating halogen with accompanying catalyst instability is due to the nature of the crystallographic form of alumina with which the halogen is initially combined. It has been found, in accordance with the present invention, that the form of alumina capable of affording stable operation upon use in reforming is that obtained upon dehydration of beta alumina trihydrate, and consisting essentially of the phase of alumina identified by X-ray crystallography as eta alumina either alone or as the predominating component in admixture with other forms of alumina obtained from dehydration of beta alumina trihydrate.

Broadly, the catalyst of the instant invention is one consisting essentially of a mechanical mixture of finely divided particles of a porous carbonaceous carrier having deposited thereon a small amount of one or more of the platinum metals, i.e. platinum, palladium, rhodium, osmium, iridium, and ruthenium and finely divided particles of porous alumina composed predominately of the eta phase obtained upon calcining beta alumina trihydrate and having incorporated therein an activating amount of an acidic promoter. The invention also provides a process for reforming hydrocarbon fractions boiling in the gasoline range by contacting them with the above catalyst in the presence of hydrogen under reforming conditions. In addition, the catalyst employed herein is characterized by ease of regeneration since the mechanical mixture of catalyst particles, after becoming spent upon use in reforming over an extended period of time, may be physically separated and the carbonaceous particles containing the platinum metal ashed to a small residue and chemical recovery of platinum thereafter carried out in a small scale operation.

The mechanically mixed catalyst of this invention should possess a dehydrogenation activity (DA) of at least 50 and an acid activity (AA) of at least 0.2 as hereinafter defined. The dehydrogenation activity (DA) index characterizing the catalyst described herein measures the catalytic efficiency of the dehydrogenation component of the catalyst. In platinum-containing catalysts, it represents the catalytic strength of the platinum in the form contained on the carrier. In evaluating dehydrogenation activity, a small amount of catalyst sample, for example, 15 milligrams deposited on a "boat" as 100–200 mesh powder is introduced into a glass reactor tube. Cyclohexane and hydrogen at atmospheric pressure are passed over the catalyst at a rate of 55.2 cc. liquid cyclohexane per hour and hydrogen in a molar ratio of 4:1 of hydrogen to hydrocarbon. The catalyst temperature is maintained at 806° F. The product liquid is analyzed for benzene by a mass spectrometer and, from its concentration, the rate of formation of benzene in units of $10^{-6}$ moles/second per gram catalyst sample is calculated. This number is designated as the dehydrogenation activity or DA index. The acid activity (AA) index measures the catalytic strength of the acid, i.e., the acidic promoter-containing component of the catalyst. The test reaction used is the rate of gas production from cumene (isopropylbenzene), which proceeds at a rate dependent on the acidity of the catalyst. The presence or absence of the platinum component does not interfere significantly with the measurement, which is done at atmospheric pressure in the absence of hydrogen. In evaluating acid activity, a small amount of catalyst sample, usually about 150 milligrams contained in a "boat" as 100–200 mesh powder is employed. Cumene is passed over the catalyst at a rate of about 100 cc./hour and the reaction rate is obtained directly from the rate of gas production at a catalyst temperature of 788° F. The result is expressed as the acid activity or AA index, such that it expresses the absolute rate of cracking in units of $10^{-6}$ moles of gas per gram of catalyst per second.

It has been established, in accordance with the present invention, that the mechanical catalyst composite consisting essentially of particles of a porous carbonaceous carrier having a platinum metal deposited thereon and particles consisting predominately of eta alumina containing an acidic promoter should essentially be characterized by a dehydrogenation activity in excess of about 50 and an acid activity greater than about 0.2. More particularly, it is preferred that the dehydrogenation activity be within the range of 100 to 5000 and the acid activity be within the range of 0.2 to 8 and especially within the range of 0.2 to 5.

The carrier employed as a support for the platinum metal component is a porous carbonaceous material which is not adversely affected by the temperature conditions of reforming. Suitable carbonaceous carriers include activated carbon, charcoal, and coke. The carbonaceous carrier desirably has a surface area greater than about 10 square meters per gram and preferably in excess of 50 square meters per gram and may extend up to 500 square meters per gram or more. The term "surface area" as used herein designates the surface area of the carrier as determined by the adsorption of nitrogen according to the method of Brunnauer et al., Journal American Chemical Society 60, 309 et seq. (1938). The carbonaceous carrier is inert, i.e., it is devoid of or exerts negligible catalytic activity under the reaction conditions of reforming. The density of the carbonaceous carrier employed, i.e., the bulk density thereof, will usually be within the range of .2 to 2.0 grams/cc.

The porous carbonaceous carrier serves as a support for a catalytically effective amount of a platinum metal, i.e., platinum, palladium, rhodium, osmium, iridium, and ruthenium, as well as alloys of these metals. Of the foregoing, platinum and palladium, and in particular platinum, are accorded preference. The amount of platinum metal contained in the ultimate catalyst is generally between about 0.05 and about 5 percent by weight and, in particular, between about 0.1 and about 2 percent by weight.

The platinum metal may be deposited on the carbonaceous carrier in any suitable manner. One feasible method is to admix particles of the carbonaceous base with an aqueous solution of an acid of the metal, for example, chloroplatinic acid or the ammonium salt of such acid of suitable concentration. The impregnated particles are then dried and treated with hydrogen at elevated temperatures to reduce the oxide to the metal.

Thus, the invention provides a reforming catalyst in the form of a mechanical mixture having as one component a platinum metal deposited on a porous carbonaceous carrier and as the other component an acid-activated alumina base having eta modifications, essentially composed of a mixture of dehydration products of beta alumina trihydrate. The invention also provides a reforming process for producing gasoline, benzene, or other aromatics from light hydrocarbon stocks by contacting the stock under reforming conditions of temperature, pressure and hydrogen partial pressure in the presence of the above-defined catalyst.

The nomenclature used in the present specification and claims with reference to alumina phase designation is that generally employed in the United States and described in "The Aluminum Industry: Aluminum and Its Production" by Edwards, Frary and Jeffries, published by McGraw-Hill (1930). The various phases of alumina, including occurrence in nature, preparation, phase transitions, crystal structure, and physical properties are described in detail in "Alumina Properties" by A. S. Russell, Aluminum Company of America, Pittsburgh (1953).

A preferred embodiment of the invention is the use of alumina in the eta form, which is obtained upon calcining beta alumina trihydrate. The latter does not occur in nature and accordingly is necessarily produced by synthetic means, such as by treating aluminum chloride solutions with ammonium hydroxide in the cold, followed by syneresis at room temperature, by saturating a solution of sodium aluminate with carbon dioxide at room temperature or by the action of water on finely divided amalgamated aluminum. The decomposition sequence of beta alumina trihydrate, upon heating one hour in dry air, is as follows:

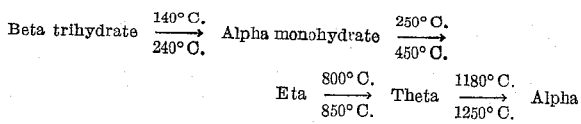

where the upper numbers show the temperature at which the next phase starts to form and the bottom numbers show the temperature at which transformation is complete.

In accordance with the present invention, it has been found that alumina composed predominately of the eta form retains acidic promoters combined therewith such as fluorine more tenaciously than various other forms of alumina. The eta form of alumina employed herein essentially has an acidic promoter combined therewith, such as fluorine. Other suitable acidic promoters include silica, boria, chromia, molybdena, chlorine, zirconia, phosphate, and sulfate.

It is contemplated that the acidic promoter may be added to the eta alumina in any feasible manner. Thus, one suitable method of adding fluorine is in the form of an acid such as hydrogen fluoride preferably employed in the form of an aqueous solution. Other suitable means for adding fluorine is in the form of volatile salts, for example, ammonium fluoride. The ammonium ions will be removed during the subsequent heating of the catalyst and therefore will not leave undesirable deposits in the catalyst. Also, fluorine or hydrogen fluoride may be used to incorporate the desired fluorine promoter in the alumina. The concentration of fluoride ion introduced into the eta alumina is such that the ultimate dry catalyst will have a fluorine content within the range from about 0.1 to about 8 percent and preferably from about 0.1 to about 5 percent by weight.

In accordance with the present invention, the weight fraction of porous carbonaceous carrier supporting the platinum metal may vary widely, thereby affording desirable flexibility in the catalyst composition which may be varied with the specific charge stock undergoing treatment and with the particular reaction conditions under which the reforming operation is effected. In general, however, the relative weight fractions of the porous carbonaceous carrier impregnated with a platinum metal and the acid-activated alumina composed predominately of alumina in the eta phase is between about 0.1 and about 0.9.

The particle size of the components comprising the catalyst mixture of this invention has been found to be a critical feature thereof. It has been established that for optimum reforming with the desired catalyst the average particle size of each of the components making up said catalyst should be less than about 100 microns. It is accordingly contemplated that the catalyst of this invention will be general comprise particles having a diameter below 100 microns and particularly a diameter in the approximate range of 1 to 100 microns.

Without being limited by any theory, it is believed that the optimum results achieved herein with finely divided particles are due to the accomplishment of the two reactions important in reforming, namely, isomerization and aromatization, by way of olefinic intermediates in accordance with the following reaction steps:

(1) 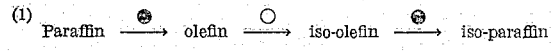

(2) 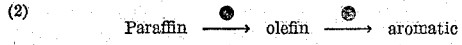

It is believed that each reaction step marked by ⊕ takes place on a dehydrogenation center, such as a platinum metal, while each step marked by ○ takes place on an acid catalyst center. It is postulated that the two components comprising the instant catalyst mixture, i.e., particles of the platinum metal deposited on a porous carbonaceous carrier and particles of acid-activated alumina composed of alumina predominately in the eta phase, should present several reaction surfaces and be sufficiently proximate to one another so that the olefinic intermediates formed during the reaction proceed to the desired isomerized or aromatized end products during the lifetime of such intermediates. It has been established that optimum reforming is attained when the particle size of the components making up the instant catalyst is fairly small and specifically less than about 100 microns in diameter.

The catalyst of this invention may be used in the form of discrete particles having the aforesaid requisite diameter, or the components having such particle size may be admixed and pelleted, cast, molded, or otherwise formed in to pieces of desired size and shape, such as rods, spheres, pellets, etc., it being essential, however, that each of said pieces is composed of particles of both components having a particle diameter of less than about 100 microns.

The process of this invention can be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation wherein the catalyst is carried out in suspension in the hydrocarbon charge is well adapted for use with the instant catalyst since pelleting or otherwise shaping of the catalyst components is thus rendered unnecessary.

The porous carbonaceous carrier for the platinum metal component of the instant catalyst as indicated hereinabove is inert with respect to the reforming of hydrocarbons, i.e., it is not effective in catalytic reforming operations under the conditions of the process of this invention. A number of platinum-containing reforming catalysts have heretofore been proposed wherein the platinum metal is impregnated on an alumina base. However, inasmuch as the alumina is not acidic, it has heretofore been the practice to combine the alumina upon which the platinum metal is deposited with acidic promoters such as halogens, boria, and the like. It is well known that such promoters are not permanent but may be lost upon contact with water vapor which is inherently or accidentally contained within the hydrocarbon feed stock.

Utilizing one embodiment of this invention, it is now possible to isolate the acidic promoted portion of the catalyst since the acid centers are located on separate particles of eta alumina distinct from the particles of porous carbonaceous carrier employed for the platinum metal component. Thus, should a catalyst of the present invention become deactivated due to the loss of acidic promoter, e.g., fluorine, therefrom by accidental contact with water vapor, it is only necessary to activate a portion of the catalyst, i.e., the eta alumina particles, by removing the same from the catalyst mixture, treating with fluorine to bring the overall fluorine content thereof up to the desired amount, and subsequently recombining the fluorine-treated eta alumina with the platinum metal component. Similarly, regeneration of the alumina particles by burning coke or carbonaceous deposit therefrom at periodic intervals may be carried out in a separate operation after resolution of the catalyst mixture into its components. It will be evident that in such manner the portion of the catalyst containing the valuable platinum metal is not subjected to activating or other processing treatment which would serve to induce a loss of the valuable metal.

The following example will serve to illustrate the process of the invention without limiting the same.

*Example*

A catalyst was prepared by suspending in 200 cc. of water, 279.5 grams of beta alumina trihydrate precipitate. To this was added 294 grams of aqueous HF solution containing 1.19 percent by weight of HF to introduce into the alumina an amount of fluorine corresponding to a fluorine content of 1.4 weight percent of the ultimate catalyst on a dry basis. The fluorinated beta alumina trihydrate was then dried for 16 hours at 135° C. and thereafter heated for 1½ hours at 232° C., 2 hours in nitrogen at 510° C., and another 2 hours in hydrogen at 510° C.

As the platinum-containing component, activated charcoal containing 0.5 weight percent of platinum was employed. This material was ball-milled until the average particle size was approximately 5 microns.

The platinum-containing component and the fluorine-activated eta alumina were mixed in equal weight proportion and ball-milled together for 16 hours, at which time an average particle size of approximately 5 microns was obtained. The resulting material was extruded through a die of 1/16 inch diameter, forming pieces of random length approximately ¼ inch in average length.

The resulting catalyst pellets were charged to a reforming unit operated at 500 p.s.i.g., 10/1 hydrogen to hydrocarbon ratio, utilizing a charge stock of naphtha having an octane number of 64.9 and a temperature within the range of 880° F. to 910° F. adjusted to maintain production of a 98 octane number (3 cc. of TEL) reformate. The activity was observed over 7.4 days of continuous operation. Expressed in terms of the reactor inlet temperature required to obtain a product of 98 octane number, the activity was as follows:

| Days: | Inlet temp. (° F.) for 98 O.N. |
|---|---|
| 0.2 | 945 |
| 1.2 | 952 |
| 2.3 | 946 |
| 3.3 | 944 |
| 4.2 | 948 |
| 5.4 | 947 |
| 6.3 | 952 |
| 7.4 | 954 |

For the duration of this operation the catalyst produced the required 98 octane number reformate with a yield of 89.4 percent volume of charge when adjusted to 10 p.s.i. Reed vapor pressure.

From the foregoing, it will be seen that the mechanical catalyst mixture of this invention consisting of acid-activated eta alumina mixed with platinum impregnated carbonaceous carrier is an effective catalyst for use in the reforming of hydrocarbons.

The ability to choose the amount of acid-activated eta alumina and the amount of platinum component making up the ultimate catalyst mixture has the advantage that amount of acidity as well as the amount of platinum metal contained in the catalyst can be controlled not only by the respective concentrations of the acidic promoter and platinum impregnating solutions but also by the respective amounts of the acid-promoted eta alumina and the platinum metal component of the catalyst. If the two-component catalyst of this invention is used in the form of a mixture of fluidized particles, the two components of the mixture will be physically independent. Accordingly, a process using catalysts in this form affords complete and immediate flexibility in catalyst composition within the limits set forth hereinabove. Thus, in changing types of charge stocks, such as between paraffinic and naphthenic stocks, the catalyst composition can be adjusted in accordance with this invention by adding or withdrawing one or the other catalyst component. For example, in transferring to a more naphthenic charge stock, a greater proportion of acid-activated eta alumina component in the present catalyst mixture will serve to increase the yield of $C_4{}^+$ gasoline. On the other hand, in transferring to paraffinic stocks, a relatively greater emphasis on the platinum metal component is desirable to reduce the cracking reaction and to emphasize dehydrocyclization.

The fact that the platinum metal and acid-activated eta alumina catalyst components used in the present mechanical catalyst mixture have generally different properties on the one hand but are seen to be operable as physically independent or separable entities on the other hand affords a basis for improved reforming processes with regard to catalyst regeneration and methods for the recovery of the valuable platinum metal constituents of the catalyst after the same has become catalytically spent.

As regards advantages in regeneration, platinum-containing reforming catalysts of the type heretofore employed in which platinum is impregnated on a cracking base have been regenerated by contacting the spent catalyst with air or other oxygen-containing gas at an elevated temperature sufficient to burn carbonaceous deposits from the catalyst. Careful control of the rate of burning, temperature, and water content of the gas atmosphere during regeneration of such catalyst have been necessary in order not to impair the activity of the catalyst. It has been found, in accordance with the present invention, that conditions and limitations for the operating variables in regeneration are quite distinct and different for the preservation of the acidic and of the platinum activities of such catalysts. For example, the presence of water vapor will cause a loss of halogen concentration resulting in loss of reforming activity, while the platinum itself does not lose its activity. On the other hand, high concentrations of oxygen and high temperatures will often reduce the effectiveness of the platinum.

By utilizing the mechanical catalyst mixture of this invention, it is possible to provide separate and optimum means for ready regeneration of each of the two components. Thus, the catalyst for the present invention, after becoming spent, may be separated into its components of platinum metal-containing particles and acid-activated eta alumina particles by providing such components with a suitable different physical characteristic which permits their ready separation, such as a difference in particle size. In those instances where a pelleted composite of acid-activated eta alumina component and platinum deposited on a porous carbonaceous carrier is employed, the catalyst mixture may be separated into its components by initially crushing to a particle size comparable to or below the magnitude of the small constituent particles and thereafter separating the component particles by flotation, air-blowing, sifting, or by any of the various other known means for separating physically and/or mechanically different materials. The separated acid-activated eta alumina particles and platinum-containing porous carbonaceous components may then be separately regenerated under conditions best suited for each.

A particular embodiment of the present invention is shown in the attached drawing wherein:

The single figure illustrates in schematic form a process in which a mechanical catalyst mixture of the type described is employed, the catalyst components separated and thereafter separately regenerated, recombined and returned to the reaction zone.

Turning now more particularly to this figure, a catalyst mixture comprising an acid-activated, e.g., fluorine-containing, alumina component, wherein alumina is predominately of the eta phase and a porous carbonaceous carrier having platinum deposited thereon and in which the alumina component is characterized by a smaller particle size than the platinum-containing component is introduced through conduit 10 into reactor 11, passing through feed vessel 12. The hydrocarbon charge is introduced into reactor 11, through conduit 13. Hydrogen is introduced into reactor 11 through conduit 14. The desired hydrocarbon conversion is effected in 11, and resulting gaseous reaction products are withdrawn through conduit 15. After an extended period of time, the catalyst mixture contained in reactor 11 becomes spent. When such point has been reached, the catalyst mixture is passed through conduit 16 into separating vessel 17 wherein the platinum-containing component, being of larger particle size, is separated from the alumina-containing component of smaller particle size. The latter component is collected in the bottom of vessel 17. The platinum-containing component is withdrawn from vessel 17 through conduit 18 and passes into furnace 19.

Air is introduced into furnace 19 through conduit 20 and the temperature is raised therein by suitable means not shown sufficiently high to effect combustion of the carbonaceous base. Combustion gases are withdrawn through outlet 21. The residual ash containing the platinum is then withdrawn from furnace 19 and passed through conduit 22 to vessel 23 in which it is brought into contact with a suitable acid mixture, such as aqua regia, introduced through conduit 24. The acid serves to dissolve the platinum from the ash. The resulting acid solution of platinum is withdrawn from vessel 23 and forced through conduit 25 to contacting vessel 26. Vessel 26 contains particles of the carbonaceous base previously introduced therein through conduit 27. The acidic platinum-containing solution coming into contact with the carbonaceous particles serves to impregnate the latter. The impregnated particles so obtained are withdrawn from vessel 26 and passed through conduit 28 into vessel 29 in which reduction of the impregnated platinum-containing carbonaceous particles is effected by introducing a reducing gas, such as hydrogen through conduit 30. The conditions maintained in vessel 29 are such as to effect reduction of the platinum-containing impregnated carbonaceous base and to afford a deposition of elemental platinum thereon. The reduced particles are thereafter withdrawn from vessel 29 and passed through conduit 31 to air-lift 32.

The alumina component collecting in the bottom of separating vessel 17 may alternatively either be withdrawn therefrom through conduit 33 and thereby be directly conducted to air-lift 32 or the alumina component may undergo intermediate activation or regeneration by being passed through conduit 34 into a reactivating or regeneration vessel 35. Activating media, for example, fluorine, hydrogen fluoride, ammonium fluoride, etc., in the case of fluorine-activated alumina, is introduced into vessel 35 through conduit 36 and is withdrawn therefrom through outlet 37. Alternatively, when it is desired to regenerate the alumina component, air or other oxygen-containing gas may be flowed through conduit 36 and the resulting regeneration gases withdrawn through conduit 37. The acid-activated alumina, after reactivation or regeneration, is withdrawn from 35 and passed through conduit 38 to air-lift 32. Air is introduced into air-lift 32 through conduit 39. The regenerated acid-activated alumina and regenerated platinum-containing component undergo intimate admixing in air-lift 32, the pressure therein being sufficient to elevate the catalyst mixture to the upper portion of the lift, and thereafter through conduit 40 which serves to recycle the catalyst mixture to vessel 12.

The above process is advantageous for recovery of platinum metal from a catalyst bearing the same since a charge of many tons of platinum-containing catalyst, in accordance with the described procedure, is reduced to a matter of pounds of residue, after which platinum recovery can be practiced on a comparatively small scale rather than on a plant scale of operation. It is contemplated that any feasible means for recovering platinum from the residual ash may be employed. It is also contemplated that the inexpensive platinum recovery step in the above process may be used to afford operations under conditions where relatively rapid deactivation of the platinum-containing component takes place and which would normally make such operations economically unfeasible due to the expense involved in regeneration or recovery of the platinum-containing catalyst.

The above process utilizing the present catalyst mixture has certain distinct operational advantages over a process wherein a conventional platinum-impregnated, halogen-containing alumina catalyst is employed. Thus, air regeneration of platinum catalysts which employ halogenated alumina as the acid base results in loss of catalytic activity. The decrease in catalyst activity is believed to be due to loss of the halogen by hydrolysis. By employing a mechanical catalyst mixture of the type described herein, using, for example, fluorinated eta alumina as the acid component, such component is regenerable without the loss of activity by initially separating the same from the porous carbonaceous component containing platinum and thereafter treating the fluorine-activated eta alumina base alone with fluorine either by direct contact fluorine or hydrogen fluoride or by impregnation with a fluoride salt and thereafter readmixing the treated alumina base with the platinum-containing component. By following the foregoing procedure, the dispersed platinum is not subjected to contact with the heating gases or solutions normally employed for regeneration of the conventional platinum-impregnated halogenated alumina catalyst.

This application is a continuation-in-part of copending application Serial No. 445,524, filed July 26, 1954.

I claim:

1. A process for reforming a hydrocarbon mixture boiling in the gasoline range, which comprises contacting the same under reforming conditions with a catalyst consisting essentially of a mechanical mixture of particles of less than about 100 microns in diameter of: (1) a porous carbonaceous carrier having deposited thereon an amount of platinum metal such that the ultimate catalyst has a platinum metal content of between about 0.05 and about 5 percent by weight and (2) alumina, activated by the presence therein of an acidic promoter, and essentially composed of a mixture of dehydration products of beta alumina trihydrate in which eta alumina is the predominating constituent, the relative weight fractions of the two components being between about 0.1 and about 0.9 and the relationship between said components being such that the resultant mixture is characterized by a dehydrogenation activity of at least 50 and an acid activity of at least 0.2, and thereafter separating the aforesaid catalyst mixture into its components, burning the carbonaceous base from the platinum-containing component, recovering platinum from the residual ash, impregnating porous carbonaceous particles with said recovered platinum, subjecting the impregnated particles to a reducing atmosphere, combining the particles resulting from such treatment with the separated alumina particles and recycling the resulting mixture to further contact with said hydrocarbon charge.

2. A process for reforming a hydrocarbon mixture boiling in the gasoline range, which comprises contacting the same under reforming conditions with a catalyst consisting essentially of a mechanical mixture of particles of less than about 100 microns in diameter of: (1) a porous carbonaceous carrier having deposited thereon an amount of platinum metal such that the ultimate catalyst has a platinum metal content of between about 0.05 and about 5 percent by weight and (2) alumina, activated by the presence therein of an acidic promoter, and essentially composed of a mixture of dehydration products of beta alumina trihydrate in which eta alumina is the predetermining constituent, the relative weight fractions of the two components being between about 0.1 and about 0.9 and the relationship between said components being such that the resultant mixture is characterized by a dehydrogenation activity of at least 50 and an acid activity of at least 0.2, and thereafter separating the aforesaid catalyst mixture into its components, separately regenerating the alumina component by contacting the same at an elevated temperature with oxygen-containing gas, burning the carbonaceous base from the platinum-containing component, recovering platinum from the residual ash, impregnating porous carbonaceous particles with said recovered platinum, subjecting the impregnated particles to a reducing atmosphere, combining the particles resulting from such treatment with the regenerated alumina particles and recycling the resulting mixture to further contact with said hydrocarbon charge.

3. A process for reforming a hydrocarbon mixture boiling in the gasoline range, which comprises contacting the same under reforming conditions with a catalyst consisting essentially of a mechanical mixture of particles of less than about 100 microns in diameter of: (1) a porous carbonaceous carrier having deposited thereon an amount of platinum such that the ultimate catalyst has a platinum content of between about 0.05 and about 5 percent by weight and (2) alumina activated with halogen in an amount such that the ultimate catalyst has a halogen content of between about 0.1 and about 8 percent by weight, said alumina being essentially composed of a mixture of dehydration products of beta alumina trihydrate in which eta alumina is the predominating constituent, the relative weight fractions of the two components being between about 0.1 and about 0.9 and the relationship between said components being such that the resultant mixture is characterized by a dehydrogenation activity of at least 50 and an acid activity of at least 0.2 and thereafter separating the aforesaid catalyst mixture into its components, activating the separated alumina component by contacting the same with a halogen compound, burning the carbonaceous base from the platinum-containing component, recovering platinum from the residual ash, impregnating porous particles with said recovered platinum, subjecting the impregnated particles to a reducing atmosphere, combining the particles resulting from such treatment with the activated alumina particles and recycling the resultant mixture to further contact with said hydrocarbon charge.

4. A process for reforming a hydrocarbon mixture boiling in the gasoline range, which comprises contacting the same under reforming conditions with a catalyst consisting essentially of a mechanical mixture of particles of less than about 100 microns in diameter of: (1) a porous carbonaceous carrier having deposited thereon an amount of platinum such that the ultimate catalyst has a platinum content of between about 0.05 and about 5 percent by weight and (2) alumina, activated with fluorine in an amount such that the ultimate catalyst has a fluorine content of between about 0.1 and about 5 percent by weight, said alumina being essentially composed of a mixture of dehydration products of beta alumina trihydrate in which eta alumina is the predominating constituent, the relative weight fractions of the two components being between about 0.1 and about 0.9, and the relationship between said components being such that the resultant mixture is characterized by a dehydrogenation activity of at least 50 and an acid activity of at least 0.2, thereafter separating the aforesaid catalyst mixture into its components, activating the separated alumina particles by treatment with a fluorine compound, burning the carbonaceous base from the separated platinum-containing component, recovering platinum from the residual ash, impregnating porous carbonaceous particles with said recovered platinum, subjecting the impregnated particles to a reducing atmosphere, combining the particles resulting from such treatment with the fluorine-activated alumina particles and recycling the resultant mixture to further contact with said hydrocarbon charge.

References Cited in the file of this patent

UNITED STATES PATENTS

| | | |
|---|---|---|
| 2,184,235 | Groll et al. | Dec. 19, 1939 |
| 2,245,735 | Subkow | June 17, 1941 |
| 2,328,828 | Marschner | Sept. 7, 1943 |
| 2,372,165 | Arveson | Mar. 20, 1945 |
| 2,734,022 | Kimberlin et al. | Feb. 7, 1956 |
| 2,780,603 | Burton | Feb. 5, 1957 |